United States Patent [19]

Lagadec

[11] Patent Number: 4,757,518

[45] Date of Patent: Jul. 12, 1988

[54] CODING DIGITAL DATA

[75] Inventor: Roger Lagadec, Atsugi, Japan

[73] Assignee: Sony Corporation, Tokyo, Japan

[21] Appl. No.: 16,586

[22] Filed: Feb. 19, 1987

[30] Foreign Application Priority Data

Feb. 26, 1986 [GB] United Kingdom ............... 8604687

[51] Int. Cl.$^4$ ............................................. H04J 3/07
[52] U.S. Cl. ....................................... 375/25; 370/83; 375/106
[58] Field of Search ................. 375/25, 106, 114, 116, 375/10, 112; 370/79, 83, 105.82, 13, 17, 84, 102; 371/42; 360/32; 381/31

[56] References Cited

U.S. PATENT DOCUMENTS

| | | |
|---|---|---|
| 3,711,650 | 1/1973 | Kuhn et al. ............................. 370/83 |
| 3,988,545 | 10/1976 | Kuemmerle et al. ................. 370/83 |
| 4,030,129 | 6/1977 | Whitlock ............................... 360/32 |
| 4,071,887 | 1/1978 | Daly et al. ............................. 370/83 |
| 4,382,297 | 5/1983 | Farrow ................................... 370/105 |

*Primary Examiner*—Benedict V. Safourek
*Attorney, Agent, or Firm*—Lewis H. Eslinger; Donald S. Dowden

[57] ABSTRACT

Digital data, such as audio data is coded by encoding apparatus, into a format of fixed-length multi-bit data words. At least one bit in the same predetermined bit position in each data word is a specific information data bit, such as channel status information or user information. A plurality of the specific information data bits from a corresponding plurality of successive data words respectively form a specific information word. Each specific information word contains a synchronizing signal, and the length of the specific information words is variable. A decoder decodes the encoded digital data.

12 Claims, 4 Drawing Sheets

NORMAL OPERATING CONDITION (48 kHz)

CODING DIGITAL DATA

BACKGROUND OF THE INVENTION

1. Field of the Invention

This invention relates to methods of and apparatus for coding digital data, and to apparatus for decoding digital data. The invention is more particularly, but not exclusively, concerned with the coding of channel status information data and user information data in the serial transmission of audio data.

2. Description of the Prior Art

Referring to FIG. 1 of the accompanying drawings, in the AES/EBU (Audio Engineering Society/European Broadcasting Union) format for the serial transmission of audio data, the audio signal to be transmitted is sampled at 48 kHz and is coded into 32-bit audio data words, each of which in fact consists of a 4-bit frame synchronizing signal, four auxiliary bits, twenty audio data bits, and a further group of four bits consisting of a validity bit, a user bit, a channel status information bit and a parity bit. The bits are recorded according to the bi-phase mark rule, except for the 4-bit synchronizing signals, which violate the rule and are so recognizable on decoding. The 4-bit synchronizing signals enable the 32-bit audio data words to be identified and correctly framed on reception. The channel status information bits from 192 successive 32-bit audio data words form a 192-bit channel status information word. Likewise, the user bits from an aligned 192 successive 32-bit audio data words form a 192-bit user word. The channel status information words and the user words are correctly framed on reception by making the 4-bit synchronizing signal in the 32-bit audio data words containing the first bit of each channel status information word and user word different from the 191 succeeding 4-bit synchronizing signals.

Briefly, the channel status information may relate to audio attributes, program attributes and transmission attributes. The user words are usable at the option of a user to convey such information as the user may wish.

It will be appreciated that in the above-described format, the channel status information words are rigidly fixed within the overall block structure. In some ways this is advantageous, because so long as the incoming signal for decoding is correctly received, the channel status information words can be reliably extracted and decoded according to fixed rules determining the position and significance of bits within the channel information status words. However, the incoming signal for decoding is not always correctly received.

FIG. 2 of the accompanying drawings shows a very simplified example of this. At the top is shown an analog audio signal which is continuous throughout, and which has been subjected to digital coding according to the format described above. Below is shown the basic structure of the resulting digital signal, each rectangle representing a block of 192 of the 32-bit audio data words including a single channel status information word. Any one of a number of faults, such as a transmission fault or a drop-out can cause a jump in the blocking, that is, a discontinuity in the block structure, whereupon the reliability of the channel status information is destroyed until the block structure has been recovered.

Likewise, the channel status information will be lost or corrupted in a number of quite normal circumstances, such as where there is a change in the frequency at which the audio signal is sampled, where there is a cross-fade between two audio signals, where there is mixing of two audio signals, or generally where there is editing of the audio signal, or even where there is a change in the speed at which the audio data is reproduced.

The problems which are referred to above and which may arise in connection with the channel status information words may similarly arise with the user words. Moreover, the proposal contained herein for alleviating these problems in respect of the channel status information words can likewise be used for the user words, although for convenience it is the channel status information words which will be mainly referred to in what follows.

OBJECTS AND SUMMARY OF THE INVENTION

One object of the present invention is to provide a method of coding digital data in which the above problems are at least alleviated.

Another object of the present invention is to provide a method of coding digital data in which specific information data bits are in a free format within a fixed format for other data bits.

Another object of the present invention is to provide a method of coding digital data in which specific information data bits are formed into specific information data words of variable length.

According to the present invention there is provided a method of coding digital data into a format of fixed-length multi-bit data words, at least one bit in the same predetermined bit position in each said data word being a specific information data bit, and wherein a plurality of said specific information data bits from an equal plurality of successive said data words respectively form a specific information word; wherein: the length of said specific information words is variable; and each said specific information word contains a synchronizing signal.

According to the present invention there is also provided apparatus for coding digital data into a format of fixed-length multi-bit data words, at least one bit in the same predetermined bit position in each said data word being a specific information data bit, the apparatus comprising: means to insert a plurality of said specific information data bits into a corresponding plurality of successive said data words respectively to form a specific information word; wherein: the length of said specific information words is variable; and each said specific information word contains a synchronizing signal.

The above, and other objects, features and advantages of this invention will be apparent from the following detailed description of illustrative embodiments which is to be read in connection with the accompanying drawings.

DESCRIPTION OF THE PREFERRED EMBODIMENTS

The invention will be described in relation to channel status information data in the AES/EBU format for serial transmission of digital audio data, but it will be understood that the invention can equally be applied to the user data in this format and to other forms of specific information data in other data formats.

Consideration of the problems referred to above leads us to realize that they can basically be traced to the fixed assignment of bits in the channel status information word; to the linking of the channel status information words to a block structure, which block structure it might be noted has no particular relevance to an audio signal, whereas it has, for example, to a video signal; and the relating to the channel status information data to the sampling rate of the audio signal.

Briefly, embodiments of the present invention alleviate the above problems by adopting a free-format for the channel status information data. That is to say, the channel status information data is given its own synchronization structure and some variability in the number of bits in each channel status information word.

Figure 3:
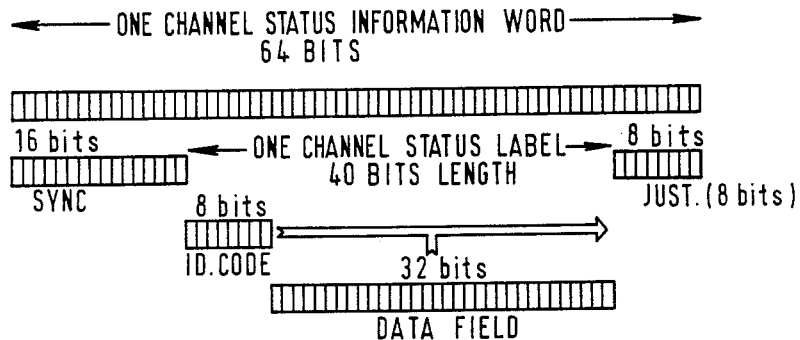
FIG. 3 shows diagrammatically a normal length channel status information word.

The invention will now be described in more detail with reference first to FIGS. 3 to 5. FIG. 3 shows diagrammatically one channel status information word in a normal operating condition at an audio sampling rate of 48 kHz. In the format referred to above the repetition rate of the 192-bit channel status information words is 250 Hz and in the present free-format this frequency is raised to 750 Hz by reducing the normal length of each channel status information word to 64 bits. Each channel status information word consists of a 16-bit synchronizing signal, having a predetermined bit pattern which may, for example, alternate between 0000 1100 1010 1111 and 1111 0011 0101 0000 from one channel status information word to the next; an 8-bit identification (ID) code; a 32-bit data field; and in the present case eight justification bits. The 8-bit ID code and the 32-bit data field together make up one channel status label which contains the variable channel status information. As stated, the number of justification bits is eight in normal operation at an audio sampling rate of 48 kHz, but is variable in the range eight plus or minus eight, that is from zero to sixteen, so enabling the refresh rate of the channel status labels to remain unchanged at 750 Hz, even if the audio sampling rate changes. The actual number of bits in a channel status information word may therefore vary within the range 64 plus or minus eight, that is from 56 to 72 inclusive. The justification bits are usually all "0", but may include an error checking code if the need for extra error checking becomes necessary.

Figure 4:
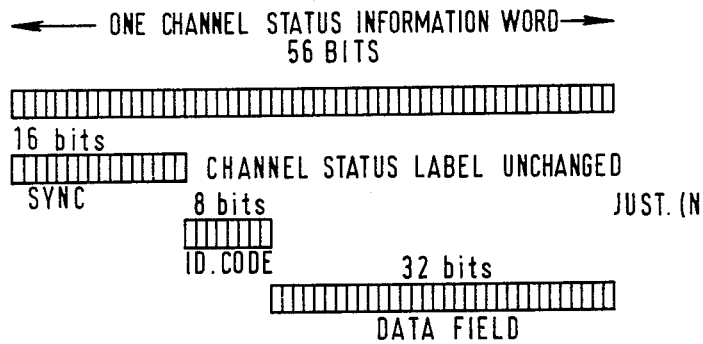
FIG. 4 shows diagrammatically a minimum length channel status information word.

FIG. 4 shows a channel status information word of minimum length, that is of 56 bits. The format is the same as that of the normal length channel status word shown in FIG. 3, except that in the minimum length word, there are no justification bits.

A channel status information word of less than the normal 64-bit length is used where the audio sampling rate is decreased from 48 kHz, and reduction of the word length to 56 bits will accommodate a decrease in the audio sampling rate to some 87.5% of 48 kHz. To give a specific example, for operation two semi-tones down from 48 kHz, that is at 42.763 kHz, the channel status information word length will be 57 or 58 bits. It should be noted that operation at a specific audio sampling rate, while maintaining the refresh rate of the channel status labels constant at 750 Hz, may involve a non-integral number of bits in the channel status information words. To accommodate this, words alternating as necessary between two adjacent bit lengths are used. This presents no problems at the decoder, because the incoming channel status information data is framed into the correct words by reference to the synchronizing signals contained in those words.

Figure 5:
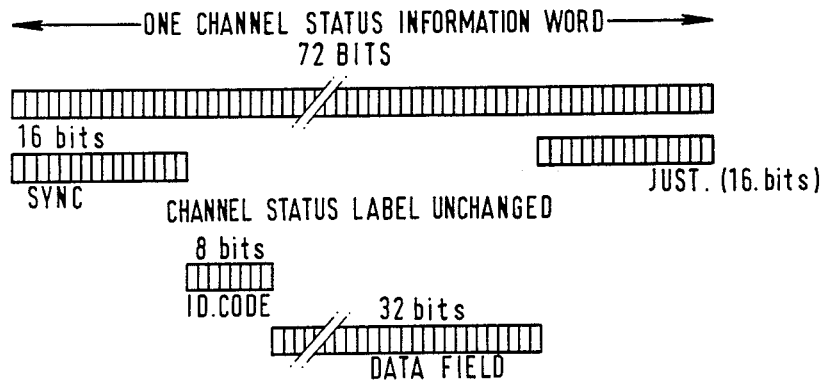
FIG. 5 shows diagrammatically a maximum length channel status information word.

FIG. 5 shows a channel status information word of maximum length, that is of 72 bits. The format is the same as that of the normal length channel status information word shown in FIG. 3, except that in the maximum length word there are sixteen justification bits.

A channel status word of more than the normal 64-bit length is used where the audio sampling rate is increased from 48 kHz, and increase of the word length to 72 bits will accommodate an increase in the audio sampling rate to some 112.5% of 48 kHz.

Figure 6:
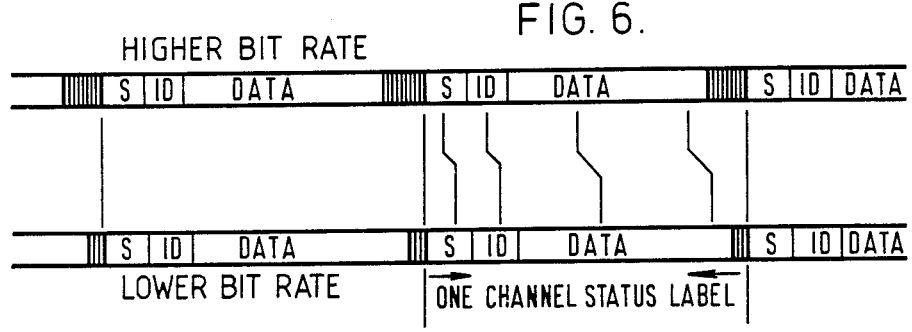
FIG. 6 shows diagrammatically the effect on the format of channel status information words of a change in the audio sampling rate.

FIG. 6 shows diagrammatically a transition from a higher bit rate to a lower bit rate in the digital audio data signal, such as might be caused by transition from a relatively high audio sampling rate to a lower audio sampling rate. It is particularly to be noted that the change does not affect the 16-bit synchronizing signal, the 8-bit ID code, or the 32-bit data field in each channel status information word. In particular, the refresh rate of the channel status labels remains constant at 750 Hz. The only change in the channel status information words is in the number of justification bits contained in each word.

It will be appreciated that the free-format for the channel status information words as described above permits realization of at least some of the following advantages:

1. The basic parameters remain centered on operation at the standard professional audio sampling rate of 48 kHz.

2. Fast recovery from single discontinuities in the sequence of channel status bits is possible. In other words, the free-format is able to recover very quickly from jumps in blocking, for example in error, cross-fading, mixing or editing conditions as mentioned above.

3. The channel status information data is freed from the concept of fixed blocks.

4. The channel status information data rate can remain constant over a range of operating audio sampling rates. In the particular example given above, the channel status label refresh rate can be maintained constant at 750 Hz over a range of audio sampling rates from at least plus 12.5% to at least minus 12.5% relative to 48 kHz.

5. The basic format of the channel status information data is independent of the audio sampling rate.

6. The range of audio frequency sampling rates which can be accommodated easily covers a particular conversion which is commonly necessary, which is between 48 kHz and 44.1 kHz.

The extent to which these advantages are achieved is of course dependent on the precise selection of the parameters of the channel status information data, within the general confines of the concept of free-formatting described above.

It will be understood that the same technique can be applied to the user data. That is say, the user data can be free-formatted into user words of variable length, each including a synchronizing signal in the form of a fixed alternating pattern, code and data bits as required, and a variable number of justification bits. There is no need for the user words to use the same format as the channel status information words, or for the user words and the channel status information words to be synchronized in the audio data format, as they are independently derived at a decoder from the incoming audio data stream by reference to their respective synchronizing signals.

Figure 1:
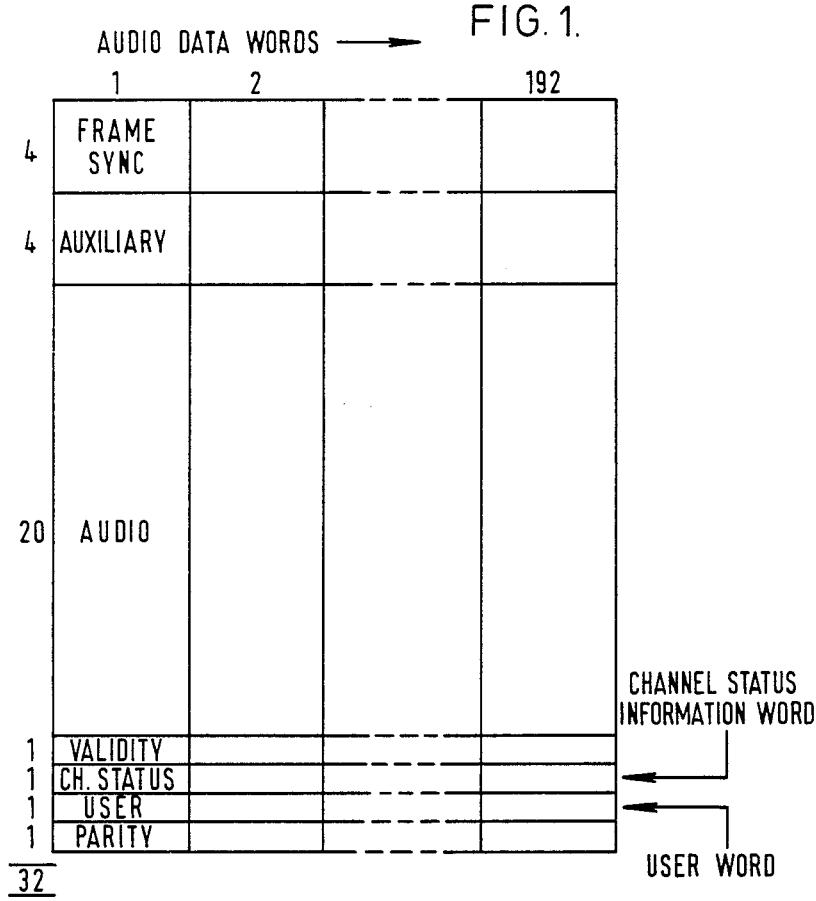
FIG. 1 shows diagrammatically the basic AES/EBU format for serial transmission of digital audio data.
Figure 2:
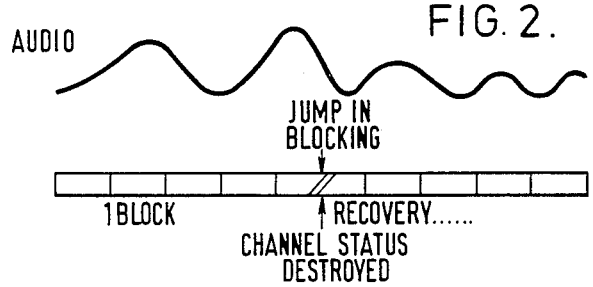
FIG. 2 shows diagrammatically an accidental block jump in an incoming signal for decoding.

A coder for inserting the channel status information words and the user words into an audio data stream will now be described with reference to FIG. 7, which shows the coder in diagrammatic block form. The audio data stream in the form of serial 32-bit words (as shown in FIG. 1) with gaps in the last three bit positions where the user bit, the channel status information bit and the parity bit, respectively, are to be inserted, is supplied by way of an input terminal 1 to the data input of a multiplexer 2. A clock pulse signal of frequency 1.536 MHz is supplied by way of an input terminal 3 to the clock input of the multiplexer 2, and also to the input of a divider 4 which divides by 32, and can be reset by a frame reset pulse supplied to a terminal 5. The divider 4 supplies a 48 kHz clock pulse signal to a divider 6 which divides by 64 (with an optional reset), and to the clock input of a channel status multiplexer and coder 7. The divider 4 also supplies a channel status enable pulse and a user enable pulse to the multiplexer 2, aligned with the 30th and 31st bit positions in the 32-bit audio data words, and a frame sync enable to a bi-phase mark encoder 8.

The coder also includes a user block multiplexer and coder 9 which also receives the 48 kHz clock pulse signal from the divider 4. The divider 6 supplies a word start signal to both the channel status multiplexer and coder 7 and to the user block multiplexer and coder 9. Channel status data as required is supplied by way of a data input 10 to the channel status multiplexer and coder 7, which may comprise a microcomputer. Likewise, user data is supplied by way of a data input 11 to the user block multiplexer and coder 9, which may also be a microcomputer. The channel status multiplexer and coder 7 supplies the channel status information bit to the multiplexer 2, while the user block multiplexer and coder 9 supplies the user bit to the multiplexer 2. The multiplexer 2 is operative to insert the channel status information bit and the user bit in the 30th and 31st positions respectively in each 32-bit audio data word. The multiplexer 2 supplies the thus-modified data stream and the incoming clock pulse signal to data and clock inputs respectively of a parity bit coder 12, which adds the necessary parity bit in the 32nd bit position of each 32-bit audio data word. The parity bit coder 12 then supplies the complete audio data stream and the incoming clock pulse signal to data and clock inputs respectively of the bi-phase mark coder 8, which supplies the outgoing audio data stream to an output terminal 13 at a frequency of 3.072 Mb/sec.

Figure 8:
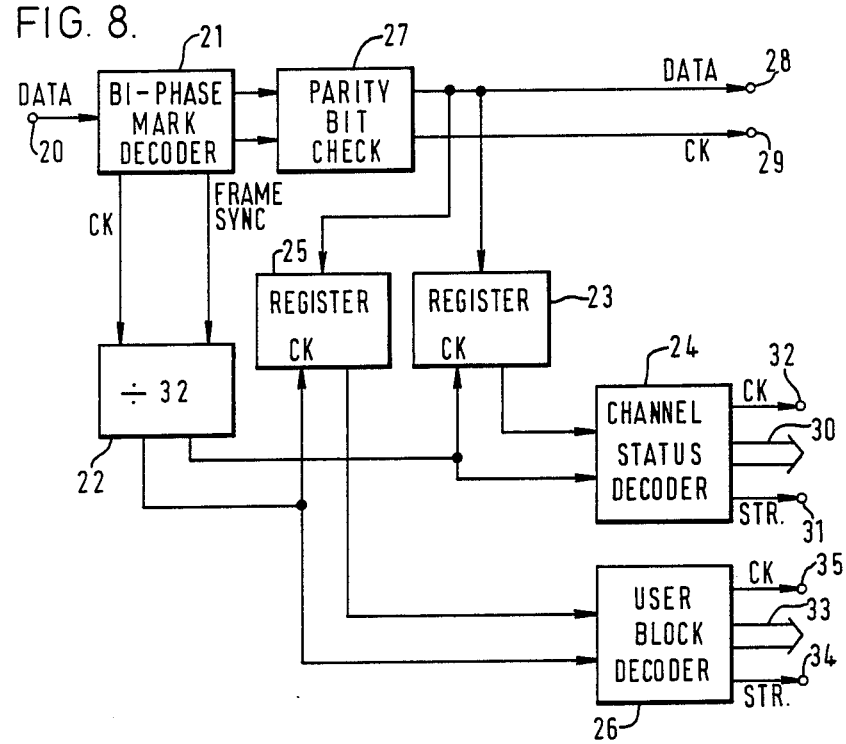
FIG. 8 shows in block form an embodiment of apparatus for decoding digital data, and according to the present invention.
Figure 7:
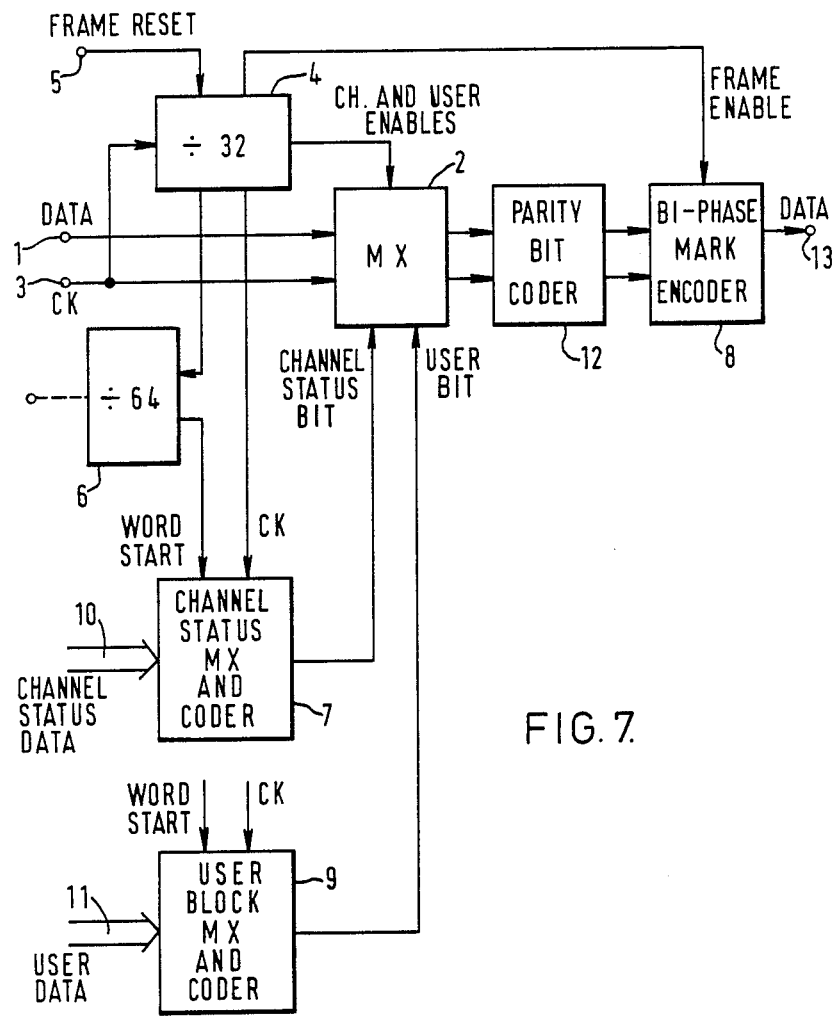
FIG. 7 shows in block form an embodiment of apparatus for coding digital data, and according to the present invention.

FIG. 8 shows in block diagrammatic form a decoder for decoding channel status information data and user data from the audio data stream produced by the coder of FIG. 7, after transmission or recording and reproduction. The incoming data stream at 3.072 Mb/sec is supplied by way of an input terminal 20 to a bi-phase mark decoder 21 which decodes the bi-phase mark signals and recovers the clock pulse signal of frequency 1.536 MHz, which is supplied to a divider 22 which divides by 32. The bi-phase mark decoder 21 also recognizes the 4-bit synchronizing signals in each 32-bit audio data word, due to the fact that these synchronizing signals violate the bi-phase mark rules, and hence derives a frame sync pulse which is supplied to the divider 22 to reset it. A first output of the divider 22 is supplied to a channel status information bit register 23 and to a channel status block decoder 24 as a clock pulse signal, and another output of the divider 32 is supplied to a user bit register 25 and to a user block decoder 26 as a clock pulse signal.

The bi-phase mark decoder 21 supplies the audio data stream and the recovered clock signal to data and clock inputs respectively of a parity bit check device 27, which supplies the output audio data to an output terminal 28, and the recovered clock pulse signal to an output terminal 29.

The signals from the divider 22 respectively strobe the registers 23 and 25 to recover the channel status information bits and the user bits respectively for supply to the channel status block decoder 24 and the user block decoder 26, respectively. The channel status block decoder 24 identifies the respective channel status information words by reference to the synchronizing signals which they contain, derives the required channel status information, and supplies it to a data output 30, together with a strobe signal at 750 Hz which is supplied to an output terminal 31, and a clock signal which is supplied to an output terminal 32.

The user block decoder 26 identifies the respective user words by reference to the synchronizing signals which they contain, derives the required user information, and supplies it a data output 33, together with a strobe signal at 750 Hz which is supplied to an output terminal 34, and a clock signal which is supplied to an output terminal 35.

Various modifications are of course possible without departing from the invention as defined by the appended claims. In particular, the use of free-formatting of certain categories of specific information words within a larger overall format is not restricted to the case of channel status information words and user words in an audio data format. Nor is the number of bits in such a specific information word restricted to the numbers given by way of example in the above description, nor is the range in the number of justification bits limited to the example given above.

I claim:

1. A method of coding digital data into a format of fixed-length multi-bit data words, at least one bit in the same predetermined bit position in each said data word being a specific information data bit, and wherein a plurality of said specific information data bits from a corresponding plurality of successive said data words respectively form a specific information word; comprising the steps of:

varying the length of said specific information words in such a manner as to maintain a constant refresh rate of a specific information portion of said specific information words; and inserting a synchronizing signal in each said specific information word.

2. A method according to claim 1 wherein said step of varying the length of said specific information words comprises including therein different numbers of justification bits from zero upwards.

3. A method according to claim 2 comprising the step of inserting "O" as each said justification bit or bits (if any), or forming said justification bit or bits into an error check code.

4. A method according to claim 2 comprising the steps of placing said synchronizing signal at the beginning of each said specific information word, and placing said justification bit or bits (if any) at the end of said specific information word.

5. A method according to claim 1 comprising the step of varying the bit rate of said data words.

6. A method according to claim 5 wherein said step of maintaining said constant refresh rate of a specific information portion of said specific information words comprises maintaining said refresh rate at 750 Hz.

7. A method according to claim 1 comprising the step of converting analog audio data to digital address data and employing said converted audio data as said digital data.

8. A method according to claim 7 comprising the step of employing channel status information data as said specific information data in one said predetermined bit position in each said data word.

9. A method according to claim 8 comprising the step of employing user information data as said specific information data in another said predetermined bit position in each said data word.

10. A method according to claim 1 comprising the step of employing an AES/EBU format as said format for serial transmission of digital audio data and employing a nominal audio sampling rate of 48 kHz.

11. Apparatus for coding digital data into a format of fixed-length multi-bit data words, at least one bit in the same predetermined bit position in each said data word being a specific information data bit, the apparatus comprising:
   means for inserting a plurality of said specific information data bits into a corresponding plurality of successive said data words respectively to form a specific information word;
   means for varying the length of said specific information words in such a manner as to maintain a constant refresh rate of a specific information portion of said specific information words; and
   means for inserting a synchronizing signal in each said specific information word.

12. Apparatus for decoding digital data coded by apparatus according to claim 11, further comprising means for extracting each said specific information data bit from said digitial data, and for identifying said specific information words by reference to said synchronizing signals.

* * * * *